United States Patent Office 3,404,991
Patented Oct. 8, 1968

3,404,991
EMULSIONS OF FATTY ACIDS
Harry Pelham Taylor, Aston Rowant, and Brian A. Pethica, Altrincham, England, assignors to British Bewoid Company Limited, London, England, a British company
No Drawing. Filed Dec. 3, 1964, Ser. No. 415,797
Claims priority, application Great Britain, Dec. 5, 1963, 48,106/63
6 Claims. (Cl. 106—132)

This invention relates to compositions containing fatty acids and to the preparation and uses of such compositions.

Fatty acids are normally immiscible with water and it is difficult to make concentrated aqueous emulsions thereof, which are pourable and stable. The term "stable" refers to stability of the emulsions under storage conditions, but is not intended to mean that the emulsions remain stable in all circumstances; for instance, they are normally unstable to the addition of electrolytes.

It has now been found that stable, fluid emulsions of the oil-in-water type can be made, having a high content of fatty acid dispersed in water and these emulsions constitute one aspect of the invention.

Another aspect of the invention consists in the use of fatty acid emulsions of any concentration in waterproofing porous materials.

The fatty acids used in carrying the invention into effect can be straight or branched, saturated or unsaturated aliphatic carboxylic acids containing at least 8 and preferably not more than 22 carbon atoms in the molecule, such as caprylic, capric, lauric, myristic, palmitic, stearic, behenic or oleic acid, used alone or admixed with each other or with small amounts of other fatty acids such as linolenic acid.

The amount of fatty acid should be at least 10% and preferably at least 20% by weight of the concentrated emulsion; a content of 30% is generally preferred; but emulsions as concentrated as 40–50% can be prepared, e.g. 50% oleic acid emulsions; a small amount of an emulsifying agent is preferably included in the composition.

The term "emulsion" is usually strictly interpreted to refer to a colloidal system of droplets of one liquid dispersed in another liquid with which it is immiscible; such definition would only embrace systems of water and liquid fatty acids; e.g. caprylic or oleic acid at room temperature; and not "dispersions" of solid acids. However the term "emulsion" will be used herein to embrace colloidal systems of solid or liquid fatty acids in water; the precise physical form of the disperse particles of solid fatty acids is not certain but the particles are probably solid or semi-solid.

The fatty acid can be added to ion-free water, preferably containing an emulsifier, with vigorous agitation at a temperature above the melting point of the fatty acid, to produce a finely dispersed oil-in-water emulsion. Agitation may be effected by any known means, e.g. by the use of a high shear agitator or ultrasonically.

When an emulsifier is used the viscosity of the emulsion will vary with the water/fatty acid ratio and usually passes through a maximum value as the water/fatty acid ratio is increased. In order to obtain a fine emulsion it is preferable to agitate for a time with the water/fatty acid ratio near to or slightly in excess of that required for maximum viscosity and then add further ion-free water with continued agitation to give the desired fatty acid concentration. The emulsion is then allowed to cool to room temperature.

If the emulsion sets to a cream on cooling, it can be fluidised by vigorously stirring the cold dispersion, possibly with addition of a little water. The cold emulsion is preferably homogenised to break up aggregated fatty acid particles.

Adjustment to a desired fatty acid content can be made finally by addition of water to the cold emulsion; ion-free water should preferably be used to avoid rendering the emulsion unstable; however, proteinaceous and other emulsion stabilisers, such as casein, gelatin, polyvinyl alcohol or sodium carboxymethyl cellulose, can be added to the aqueous phase prior to addition of the acid, and they give some protection against the effect of the ions in hard water.

Emulsions can also be prepared, with some difficulty, without melting the fatty acid. Thus stearic acid in flake form can be suspended in a solution of an emulsifier at room temperature and subjected to a high speed macerator, and the emulsion refined by passing through a hand powered homogeniser; the stability during storage is poor however.

The inclusion of an emulsifier is highly desirable in promoting storage stability and in reducing the amount of agitation which is needed to produce a stable emulsion. A wide variety of emulsifiers can be used; suitable emulsifiers include the anionic surface active agents having a sulphate or sulphonate group joined directly or through an ester, ether or amide link to a hydrophobic alkyl or alkaryl group, e.g. sodium dodecyl sulphate, sodium dodecylbenzene sulphonate, sodium triethoxy dodecyl sulphate, ammonium hexaethoxy dodecyl phenol sulphate, sodium-3 (N-dodecyl carbamoyl)-propyl-1 sulphate, sodium dodecyl sulpho-acetate, sodium tridecyl sulphosuccinate, sodium N- sulphomethylene lauramide, and coconut oil ethanolamide sulphosuccinate. Cationic surface active agents such as quaternary ammonium salts, e.g. cetyl trimethyl ammonium bromide and dodecyl trimethyl ammonium chloride give good results with pure stearic acid. Nonionic emulsifiers such as polyethoxylated cetyl alcohol, polyethoxylated nonyl phenol or polyethoxylated sorbitan mono-oleate can also be used. Nonionic emulsifiers are, in general, very good, but the resulting emulsions usually have such a high stability even on the addition of electrolytes, especially alum, that the emulsions are not effective in internal paper sizing, because the fatty acid is not properly deposited upon the paper fibers. These emulsions can normally be adequately destabilized for paper sizing purposes by the addition of an anionic or cationic surface-active agent, such as those already mentioned. For instance, a very stable emulsion including a nonionic emulsifier can be made suitable for paper sizing by the incorporation of an anionic or cationic surface-active agent in an amount of 25% of the amount of the nonionic compound.

Another kind of emulsifier which may be used consists of soaps of rosins, rosin esters and of Diels-Alder adducts. Such substances are well known as the main constituents of some paper-making sizes or as fortifiers for such sizes; but rosin is not always readily available, and it has been established that conventional rosin-based materials can be largely or entirely replaced in sizing by emulsions containing readily available fatty acids or crude mixtures thereof. The use of fatty acids emulsions in sizing permits higher drying temperatures to be used; there is also the advantage that less control of the water content of the paper before it enters the driers is needed since the sizing performance is but little affected by such water content.

According to the invention, dilute or concentrated emulsions can be applied to fabrics, paper, ceramics, concrete, plaster and other materials to waterproof them.

In waterproofing, i.e. sizing, paper, the sizing emulsion may be added in concentrated or diluted form, prefrably the latter, to the stock (the suspension of paper-forming fibres in water) in the beater (this is "engine sizing"), or the emulsion can be mixed with beaten stock, or it can be applied to the surface of the drying or dried paper web. If the fatty acid emulsion is added to the beater under hard water conditions, it is advisable to make the addition toward the end of the heating cycle and after the addition of alum, in order to obtain the full sizing effect. Frequently, the heating cycle includes Jordan refining, and in this case the fatty acid emulsion is preferably added after the Jordan process, if appreciable water hardness is present. It is preferred in sizing paper to use emulsions of saturated fatty acids, especially of capric or lauric acid, or mixtures containing a minor proportion, preferably less than 10%, of unsaturated acids, since the use of more than 10% of unsaturated acids tend to give sizing products unstable to oxidation. For paper sizing, saturated acids should be of chain length greater than C8. Branched chain acids are also poor sizing agents.

The following examples are provided to illustrate the invention.

EXAMPLE 1

Preparation of emulsion using ionic emulsifier 30 g. of molten stearic acid are slowly added to a vigorously agitated aqueous solution containing 2 g. of an anionic or cationic emulsifier (e.g. sodium dodecyl benzene sulphonate) in 30 ml. of ion-free water at a temperature of 80°–85° C., together with a stabiliser (e.g. 2 g. gelatin) if desired; the minimum amount of ion-free water needed may be added to keep the emulsion mobile. After agitation for about 5 minutes further hot ion-free water is added to bring the emulsion to the desired fatty acid content (e.g. 30% by weight).

If during cooling the agitation is stopped or is insufficient, the emulsion may thicken or solidify but redispersion to a fluid condition may be achieved by vigorous stirring and possibly addition of a little further water. The cold emulsion is then homogenised. Homogenization, e.g. in a mechanical "Rannie" homogenizer, can be carried on the emulsion immediately it has been prepared, i.e. while it is still at 80°–85° C. when working on larger scale batches. This gives a more fluid product than using hand homogenizer on a laboratory scale batch.

EXAMPLE 2

Preparation of emulsing using rosin emulsifier 25 lbs. of rosin were melted in a vessel provided with heating means and an agitator, 10 lbs. of a rosin ester/maleic anhydride reaction product (made according to U.S. Patent No. 3,044,890) were added thereto, and the mixture was heated to a temperature of 120°–140° C. with continuous intensive agitation. The mixture of rosin and rosin ester reaction product was then partially neutralised with a solution of 1.25 lbs. of caustic soda in 2 litres of water.

A solution of 8.5 lbs. of lactic casein in 35 litres of water containing 0.25 lbs. of caustic soda was prepared as stabiliser; after adjusting the temperature of this solution to 40°–45° C., it was added to the stirred rosin dispersion.

160 lbs. of a fatty acid mixture was made of the following composition by weight: stearic acid 60%, palmitic acid 32%, oleic acid 3%, glycerides 5%; this was added at a temperature of 80° C. to the rosin/casein dispersion, and the whole was agitated at high speed for 5 minutes. The resultant fatty acid dispersion was then diluted with cold water to adjust the solids content as required.

EXAMPLE 3

Paper sizing

To illustrate the effectiveness of emulsions according to the invention in the sizing of paper, they were tested by adding them to beaten paper stock, precipitating them thereon with aluminium sulphate, forming a sheet on a standard British Paper and Board Manufacturers' Research Association sheetmaking machine, and drying the sheet so formed. This was effected by pressing the wet sheets to 62–64% moisture content before drying at 80° C. for 10 minutes and then at 108° C. for 6 minutes. The sheets were then tested for water-resistance by the Cobb test in which the water absorption after 1 minute is determined; sheets sized with a conventional high free rosin size were also tested for comparison. The results are set out in the following table: Nos. 1 to 12 relate to emulsions made by the procedure of Example 1, using 30 g. stearic acid and 2 g. of surface-active agent, homogenizing the cool dispersion, and adding the emulsion to the stock to give a content of 0.3% (except No. 11, 0.5%) by weight of fatty acid and surface-active agent in the stock; Nos. 13 to 19 relate to emulsions made by the procedure of Example 2, using about 36 lb. rosin-ester adduct, 8.5 lb. casein, and 160 lb. crude fatty acid in a total concentration in the stock of 0.5% by weight. Ion-free water was used in these sizing experiments except those marked with an asterisk; slightly inferior results are obtained if hard water is used

PAPER SIZING TESTS

| Fatty acid | Emulsifier | Sizing concn., percent | 1 min. Cobb value |
|---|---|---|---|
| 1. Capric ($C_{10}$) | Na TLS | *0.3 | 21.6 |
| 2. Lausic ($C_{12}$) | Na TLS | *0.3 | 21.5 |
| 3. Lauric ($C_{12}$) | Na DBS+casein | 0.3 | 18.8 |
| 4. Stearic ($C_{18}$) | do | *0.3 | 22.8 |
| 5. Stearic ($C_{18}$) | Na dodecyl sulphate. | 0.3 | 19.0 |
| 6. Stearic ($C_{18}$) | Na triethoxy dodecanol sulphate. | 0.3 | 18.3 |
| 7. Stearic ($C_{18}$) | K undecane 1-sulphonate. | 0.3 | 18.8 |
| 8. Stearic ($C_{18}$) | Na N-sulphomethyl lauramide. | 0.3 | 20.3 |
| 9. Stearic ($C_{18}$) | Dodecyl trimethyl $NH_4Cl$. | 0.3 | 21.7 |
| 10. Oleic ($C_{18}$ unsaturated) | Na TLS | *0.3 | 25.5 |
| 11. Oleic ($C_{18}$ unsaturated) | Na DBS+casein | 0.5 | 23.4 |
| 12. $C_{19}$ branched chain fatty acid. | do | 0.3 | *49 |
| 13. 95% pure lauric | Rosin ester adduct | 0.5 | 19.1 |
| 14. 95% pure myristic ($C_{14}$) | do | 0.5 | 21.9 |
| 15. 95% pure palmitic ($C_{16}$) | do | 0.5 | 19.5 |
| 16. Mixture of 60% by weight stearic, 32% palmitic, 3% oleic acid, 5% glycerides. | do | 0.5 | 20.8 |
| 17. Mixture of 51% stearic, 32% palmitic, 4% myristic, 9% oleic acid, 4% higher saturated acids. | do | 0.5 | 20.2 |
| 18. Mixture of 45% stearic, 52% palmitic, 1% myristic, 2% oleic acid. | do | 0.5 | 20.5 |
| 19. Mixture of 6% stearic, 16% palmitic, 6% linoleic, 1% linolenic, 70% oleic, 1% unsaponifiable matter. | do | 0.5 | 23.0 |
| Conventional high free rosin size: | | | |
| For comparison with Expts. 5 to 9 | | 0.3 | 19.5 |
| For comparison with Expts. 13 to 19 | | 0.5 | 20.0 |

*Water used in sizing was 24° hard.
Na TLS=sodium triethoxy lauryl sulphate.
Na DBS=sodium dodecyl benzene sulphonate.

EXAMPLE 4

Textile waterproofing

Pieces of cotton sheeting, terry towelling and woollen fabric were immersed for ½ minute in 1% alum solution as a mordant. The excess alum solution was removed by blotting and the fabrics were then immersed for 1 minute in diluted fatty acid size emulsions containing 0.005% to 1.0% of solids. The original undiluted emulsion contained 30% commercial stearic acid, 2% sodium dodecyl benzene sulphonate and 2% casein. The fabrics were then blotted to remove excess size and dried by pressing at 108° C. All the treated fabrics were strongly water repellent, even after treatment with fatty acid solvents, e.g. carbon tetrachloride.

EXAMPLE 5

This example demonstrates the superiority of the fatty acid emulsions of the invention over known fortified rosin emulsions under conditions of rapid drying at high temperatures.

HYLTE H.B.A. BLEACHED SULPHITE PULP 0.5% Sizing level—(emulsions added after dilution to 1%)
Moisture content of wet sheet—62–64%
Drying conditions—130° C. for 15 minutes

| Fatty Acid | Emulsifier | Distilled water (avg.), 1 min. Cobb value | 22° H water (Wirral water) |
|---|---|---|---|
| Distilled, hardened bonegrease fatty acids. | Na lauryl triethoxy sulphate (Empimin 3003). | 13.7 | 18.8 |
| Do | Na dodecylbenzene sulphonate (Na DOBS-JN). | 14.0 | 20.5 |
| Do | Na lauryl sulphate | 14.3 | |
| Distilled, hardened tallow fatty acids. | do | 14.6 | |
| Fortified freerosin emulsion size. | | 17.4 | 22.4 |

Many attempts have been made in the past to prepare emulsions of fatty acids, partly because emulsions of materials can often be used more easily than the materials themselves. For instance, British specification No. 643,765 relates to emulsions of saturated fatty acids, which are prepared by using, as emulsifying agents, fatty acid esters of high molecular weight polyethylene glycols. The emulsions so prepared are suitable for coating paper, but they are unsatisfactory when used as sizing agents. Belgian specification No. 499,516 also relates to the preparation of emulsions of fatty acids for use in paper sizing and discloses the use of emulsifying agents such as sodium tetraborate, sodium sulphoricinate and triethanolamine ricinoleate.

This invention is essentially predicated upon the discovery of the emulsifying and stabilizing properties of the various classes of ionic and rosin-based emulsifiers described herein, with the inclusion of proteinaceous or other stabilizers in the system, if desired. These essential properties are shown especially by the sodium, potassium and ammonium salts of dodecyl benzene sulphonic of triethoxy lauryl sulphuric acids and related anionic surface-active agents having a sulphate or sulphonate group joined directly or through an ester, ether or amide link to a hydrophobic alkyl or alkaryl group.

In carrying out the invention, it is preferable to prepare an aqueous emulsification system comprising preferably ion-free water, the selected anionic or other emulsifier and (where used) the stabilizer, maintain this system at an elevated temperature sufficient for the purpose, i.e. one at which the fatty acid or fatty acid mixture will be liquid, and then add the acid material to the emulsification system using vigorous mechanical agitation.

We claim:

1. A composition of matter consisting essentially of a stable pourable fluid oil-in-water emulsion of a fatty acid selected from the group consisting of straight and branched, saturated and unsaturated aliphatic carboxylic acids containing 8 to 22 carbon atoms in the molecule the emulsion containing at least 10% by weight of the fatty acid and including as an emulsifier for the fatty acid a minor proportion, based on the weight of fatty acid, or a soap of a rosin Diels-Alder adduct.

2. A composition of matter according to claim 1 which includes a stabilizer selected from the group consisting of proteinaceous colloids, polyvinyl alcohol and sodium carboxymethyl cellulose.

3. A method of preparation of a composition of matter consisting essentially of a stable pourable fluid oil-in-water emulsion of a fatty acid, which method comprises adding to water a fatty acid selected from the group consisting of straight and branched, saturated and unsaturated aliphatic carboxylic acids containing 8 to 22 carbon atoms in the molecule, the amount of acid being at least 10% by weight of the composition, and subjecting the mixture so formed to vigorous agitation in the presence of a minor proportion, based on the weight of fatty acid, of a soap of a rosin Diels-Alder adduct for a time sufficient to produce the desired oil-in-water emulsion in a stable form.

4. A method according to claim 3, in which the aqueous phase contains a stabilizer selected from the group consisting of proteinaceous colloids, polyvinyl alcohol and sodium carboxymethyl cellulose.

5. A method according to claim 3, in which the water/fatty acid ratio is initially in excess of that required in the prepared emulsion, agitation is effected to emulsify the acid, and further water is then added with continued agitation to impart the desired fatty acid concentration to the emulsified composition.

6. A method according to claim 3, in which no more than 10% by weight of the total fatty acid content consists of unsaturated fatty acids.

References Cited

UNITED STATES PATENTS

| | | | |
|---|---|---|---|
| 2,780,554 | 2/1957 | Lerner | 106—27 |
| 2,319,957 | 5/1943 | Speicher | 117—16 |
| 2,371,933 | 4/1945 | Steinbock | 106—13 |
| 3,044,890 | 7/1962 | Boughton | 106—23 |
| 2,530,370 | 11/1950 | Auer | 106—219 |
| 2,765,223 | 10/1950 | Candee et al. | 106—131 |
| 3,108,889 | 10/1963 | Miranda | 106—29 |

FOREIGN PATENTS

| | | |
|---|---|---|
| 657,773 | 2/1963 | Canada. |
| 591,903 | 2/1960 | Canada. |

OTHER REFERENCES

Condensed Chemical Dictionary: p. 438.

JAMES A. SEIDLECK, *Primary Examiner.*

T. MORRIS, *Assistant Examiner.*